(12) United States Patent
Fietz

(10) Patent No.: US 7,857,322 B2
(45) Date of Patent: Dec. 28, 2010

(54) SEALING RING

(75) Inventor: Roland Fietz, Neustadt-Momberg (DE)

(73) Assignee: Carl Freudenberg KG, Weinheim (DE)

( * ) Notice: Subject to any disclaimer, the term of this patent is extended or adjusted under 35 U.S.C. 154(b) by 793 days.

(21) Appl. No.: 11/726,800

(22) Filed: Mar. 23, 2007

(65) Prior Publication Data

US 2009/0014963 A1    Jan. 15, 2009

(30) Foreign Application Priority Data

Mar. 23, 2006   (EP) .................................. 06005968

(51) Int. Cl.
*F16J 15/32*    (2006.01)
(52) U.S. Cl. ...................... 277/566; 277/615; 277/644; 277/649
(58) Field of Classification Search .................. 277/644, 277/648, 649, 566, 615
See application file for complete search history.

(56) References Cited

U.S. PATENT DOCUMENTS

| | | | | |
|---|---|---|---|---|
| 126,624 | A * | 5/1872 | Coffee ......................... | 277/649 |
| 2,032,492 | A * | 3/1936 | Nathan ........................ | 277/615 |
| 2,156,681 | A * | 5/1939 | Dewhirst et al. .............. | 404/65 |
| 2,451,070 | A * | 10/1948 | Chamberlain ................ | 277/617 |
| 2,841,429 | A | 10/1955 | McCuiston .................. | 288/19 |
| RE24,478 | E * | 5/1958 | Kilbourne, Jr. .............. | 277/650 |
| 3,052,478 | A * | 9/1962 | Horvereid .................... | 277/394 |
| 3,215,441 | A * | 11/1965 | Horvereid .................... | 277/437 |
| 3,472,523 | A * | 10/1969 | Carlson, Jr. et al. ......... | 277/649 |
| 3,550,990 | A * | 12/1970 | Carlson, Jr. et al. ......... | 277/566 |
| 3,647,229 | A * | 3/1972 | Grimes ........................ | 277/615 |
| 3,831,950 | A * | 8/1974 | Bentley et al. .............. | 277/649 |
| 3,854,737 | A * | 12/1974 | Gilliam, Sr. .................. | 277/566 |
| 3,909,019 | A * | 9/1975 | Leko ........................... | 277/649 |
| 3,913,928 | A * | 10/1975 | Yamaguchi .................. | 277/604 |
| 4,293,138 | A * | 10/1981 | Swantee ...................... | 277/607 |
| 4,429,886 | A * | 2/1984 | Buttner ........................ | 277/606 |
| 4,475,738 | A * | 10/1984 | Eicher et al. ................. | 277/345 |
| 4,693,343 | A | 9/1987 | Boyd ..................... | 188/322.17 |
| 5,002,290 | A * | 3/1991 | Pernin ........................ | 277/649 |
| 5,085,443 | A * | 2/1992 | Richards ..................... | 277/412 |
| 5,580,068 | A * | 12/1996 | Gundy ........................ | 277/605 |
| 5,653,452 | A * | 8/1997 | Jarvenkyla .................. | 277/607 |
| 6,149,163 | A * | 11/2000 | Brown et al. ................. | 277/560 |
| 6,179,297 | B1 * | 1/2001 | Bauman et al. ............. | 277/437 |
| 6,264,206 | B1 * | 7/2001 | Hashizawa et al. .......... | 277/641 |
| 7,004,474 | B2 * | 2/2006 | Takahashi et al. ........... | 277/402 |

FOREIGN PATENT DOCUMENTS

| | | |
|---|---|---|
| CH | 392 180 | 9/1965 |
| DE | 42 43 417 | 3/1994 |
| EP | 1 277 773 | 9/2007 |
| GB | 852507 | 10/1960 |

* cited by examiner

*Primary Examiner*—Alison K Pickard
(74) *Attorney, Agent, or Firm*—Pearl Cohen Zedek Latzer LLP

(57) ABSTRACT

The present invention provides a sealing ring having at least eight sealing edges. Sealing rings, such as O-ring seals, are generally known. These universal sealing rings can be used for statically or dynamically sealing machine elements. They have the advantage of being suited for a wide variety of possible applications, and of being simple and cost-effective to manufacture.

14 Claims, 7 Drawing Sheets

SEALING RING

This claims the benefit of European Patent Application No. 06 005 968, filed Mar. 23, 2006, and hereby incorporated by reference herein.

FIELD OF THE INVENTION

The present invention relates to a sealing ring.

BACKGROUND

Sealing rings, such as O-ring seals, are generally known.

These universal sealing rings can be used for statically or dynamically sealing machine elements. They have the advantage of being suited for a wide variety of possible applications, and of being simple and cost-effective to manufacture.

An inherent disadvantage of O-rings is that, during installation or normal use, particularly when performing dynamic sealing tasks in the presence of axial motion of the machine elements to be sealed from one another, they are subject to the risk of twisting/distortion.

Moreover, in order to provide an effective sealing action when performing dynamic sealing tasks, it is necessary for the previously known sealing rings to be vigorously compressed inside of their installation space. This produces high frictional forces in response to the relative motion of the machine elements to be sealed from one another, because the round sealing edges of the sealing rings then flatten considerably, resulting in a large contact surface at the machine elements to be sealed.

Another disadvantage inherent to the manufacturing process is that the O-rings have flash lines which, for the most part, are located on the inside and outside diameters and, thus, precisely on the functional surfaces important to many sealing applications.

Due to the circular cross section of O-rings, the number of sealing locations in the installation space, for example in a classic rectangular groove, is limited to two sealing surfaces, for example the outside and inside diameters or the axial end faces.

SUMMARY OF THE INVENTION

It is an object of the present invention to further refine a universal sealing ring of the type mentioned at the outset in such a way that the above-mentioned disadvantages will be overcome, and the sealing ring will exhibit improved performance characteristics for sealing liquid or gaseous media. It is intended that the sealing ring according to the present invention provide reliable sealing action at relatively high pressures and/or when performing dynamic sealing tasks at high relative speeds.

The present invention provides a sealing ring having at least eight sealing edges. Such a sealing ring has universal applicability, both for static, as well as for dynamic sealing tasks. The sealing ring may be used for sealing liquid or gaseous media and, for example, be used in place of a conventional O-ring.

The sealing ring of the present invention may be used for sealing against dynamically oscillating axial movements, for example for sealing rods or pistons capable of reciprocating translational motion, as it may just as well be used for sealing against dynamic rotational movements of rotating, slewing or helicoidally moving shafts, rods or spindles.

A principal advantage of a sealing ring having at least eight sealing edges is that, similarly to an O-ring of the same material, it is simple and inexpensive to manufacture, however, in comparison thereto, it is not subject to the risk of twisting/distortion and, therefore, of undesirable leakage during installation and normal use thereof.

Due to the high number of sealing edges, the claimed sealing ring exhibits an improved sealing action. In comparison to O-rings, the sealing edges of the claimed sealing ring have a different design; instead of the round sealing edges characteristic of O-rings, the sealing edges of the claimed sealing ring are bounded by mutually intersecting conical surfaces. Due to their sharp-edged configuration, the sealing edges are able to exert a higher surface pressure on the surfaces to be sealed when engaging on the same, thereby providing a more effective sealing action.

The sealing edges may each be bounded by mutually intersecting conical surfaces.

One advantageous embodiment provides for three of the sealing edges to be disposed on the radially inner side and three of the sealing edges on the radially outer side, and for the radially inner sealing edges and the radially outer sealing edges to be configured mutually adjacently, in each case with axial clearance therebetween. In this context, the radially inner sealing edges are functionally connected in series, as are the radially outer sealing edges. The sealing edge most proximate to the space to be sealed and facing the same assumes the main sealing function, while the two downstream sealing edges seal against any leakage that has escaped past the upstream sealing edge.

The radially inner sealing edges and the radially outer sealing edges are disposed in mutual radial opposition, each in a respective imaginary radial plane. Here the advantage is derived that the radial sealing edges, which are disposed in an imaginary radial plane, mutually influence each other in a way that permits the respective sealing edges to exert a comparatively high surface pressure on the machine element to be sealed when engaging on the same. Moreover, a design of this kind ensures that, in the installed state, the sealing ring is not subject to undesirable torque.

At least one of the two end faces may have two axial sealing edges which are configured mutually adjacently, with radial clearance therebetween, and are each bounded by mutually intersecting conical surfaces. Besides the radial sealing action, the axial sealing edges may also provide an axial sealing action, for example when the sealing ring is installed in a classic rectangular groove.

Both end faces may preferably have two axial sealing edges each. Regardless of which side of the sealing ring is subject to axial pressure loads, an axial sealing action is provided in the installation space.

An at least partially circumferential support bead, which has a lesser axial extent than the axial sealing edges, may be radially configured between the mutually adjacent, axial sealing edges of at least one end face. It is also preferred that the sealing ring have such a support bead in the area of each end face. This makes it possible for the sealing ring to withstand higher axial pressure loads. Before the axial sealing edges are subject to a differential pressure-induced deformation of undesirable magnitude, the support bead configured radially between the axial sealing edges engages on an adjacent surface to be sealed, thereby restricting any further deformation of the axial sealing edges. This prevents any mechanical overloading of the axial sealing edges. The sealing ring exhibits consistently good performance characteristics over a long service life.

The sealing ring may have a symmetrical design with respect to an imaginary, axially central, radial plane. Thus, regardless of which of the two axial end faces is subject to a comparatively higher differential pressure, the sealing ring has mutually conforming performance characteristics.

The axially central, radial sealing edges may have a larger sealing edge radius than the radial sealing edges disposed axially adjacently, respectively, on both sides. In contrast to the radial sealing edges disposed axially adjacently on both sides, the centrally disposed radial sealing edges not only have a sealing function, but also a supporting function, similarly to the support bead provided between the two radially mutually adjacent, axial sealing edges. However, the sealing edge radius of the axially central, radial sealing edges is still substantially smaller than the radius of O-rings of an equivalent size. As a result, the axially central, radial sealing edges exhibit both an effective sealing function, as well as an effective supporting function.

With the exception of the centrally disposed radial sealing edges, the design of all sealing edges may conform. In contrast to specialized sealing elements, such as grooved rings, which are mostly optimized as piston or rod seals for the particular application, the sealing ring according to the present invention offers the advantage of universal application possibilities.

Viewed in longitudinal section, the transitional regions between the axially adjacent, radial sealing edges and/or between the radially adjacent, axial sealing edges may have a concave form. The advantage is thereby derived that, even when the sealing ring is subject to a pressure load, only the sealing edges engage on the surface to be sealed; as a result, the sealing ring does not contact the surface to be sealed over a large area, and frictional losses, as well as frictional heat are minimized.

The transitional regions between the radially inner or outer sealing edges may have a smaller radial depth than the transitional regions between the radially outer or inner sealing edges.

The described embodiment is dependent on the method for manufacturing the sealing ring. By considering the ratio of the different radial depths of the transitional regions on the inside and outside diameters, it is possible for the sealing ring to be held in a defined manner on the ejector side of a mold during manufacturing, thereby ensuring a trouble-free, fully automatic manufacturing process. If the mold used for manufacturing the sealing ring is provided with an inwardly-engaging mushroom-shaped ejector, the greater radial depth of the transitional regions is provided on the outside diameter of the sealing ring. By employing such a design, the sealing ring remains stuck by its deeper transitional regions to the ejector side and is able to be pushed out by the mushroom-shaped ejector.

If, in contrast, the mold has an externally-engaging ejector plate, the radial depth of the radially inner transitional regions is greater than that of the radially outer transitional regions. The sealing ring remains stuck by its deeper transitional regions to the core of the ejector side and is able to be pushed out by the ejector plate.

At least the transitional regions between mutually adjacent, dynamically stressed sealing edges may be designed as lubricant pockets which are fillable with a lubricant. Here, the advantage is derived that the mutually adjacent, dynamically stressed sealing edges are sufficiently lubricated, even when there is no or only negligible leakage escaping from the space to be sealed in the direction of the dynamically stressed sealing edges. Moreover, the sealing result is further improved by the lubricant-filled lubricant pockets.

With regard to a simple and inexpensive producibility of the sealing ring, it may be formed in one piece and uniformly of the same material.

For most applications, sealing rings of a thermoplastic polyurethane are particularly well suited; in most cases, the sealing rings preferably having a Shore hardness A of 80 to 90. In contrast to elastomers, thermoplastic polyurethanes advantageously feature, inter alia, better abrasion resistance, tensile strength, elongation at break, resistance to tear propagation, and low-temperature properties. Moreover, a thermoplastic polyurethane is suited for manufacturing processes in modern and efficient injection molding machines.

BRIEF DESCRIPTION OF THE DRAWINGS

A few exemplary embodiments of the sealing ring according to the present invention are explained in greater detail in the following with reference to FIG. 1 through 10.

They show schematically.

DETAILED DESCRIPTION OF THE EMBODIMENTS

Ten exemplary embodiments of the sealing ring according to the present invention are illustrated in FIG. 1 through 10.

Each of the sealing rings has at least eight sealing edges 1 through 8 which are each bounded by mutually intersecting conical surfaces 11, 12.

The illustrated sealing rings are manufactured using different methods.

The exemplary embodiments of FIGS. 1, 3, 5, 7 and 9 are manufactured in a mold having an inwardly-engaging mushroom-shaped ejector.

Figure 11:
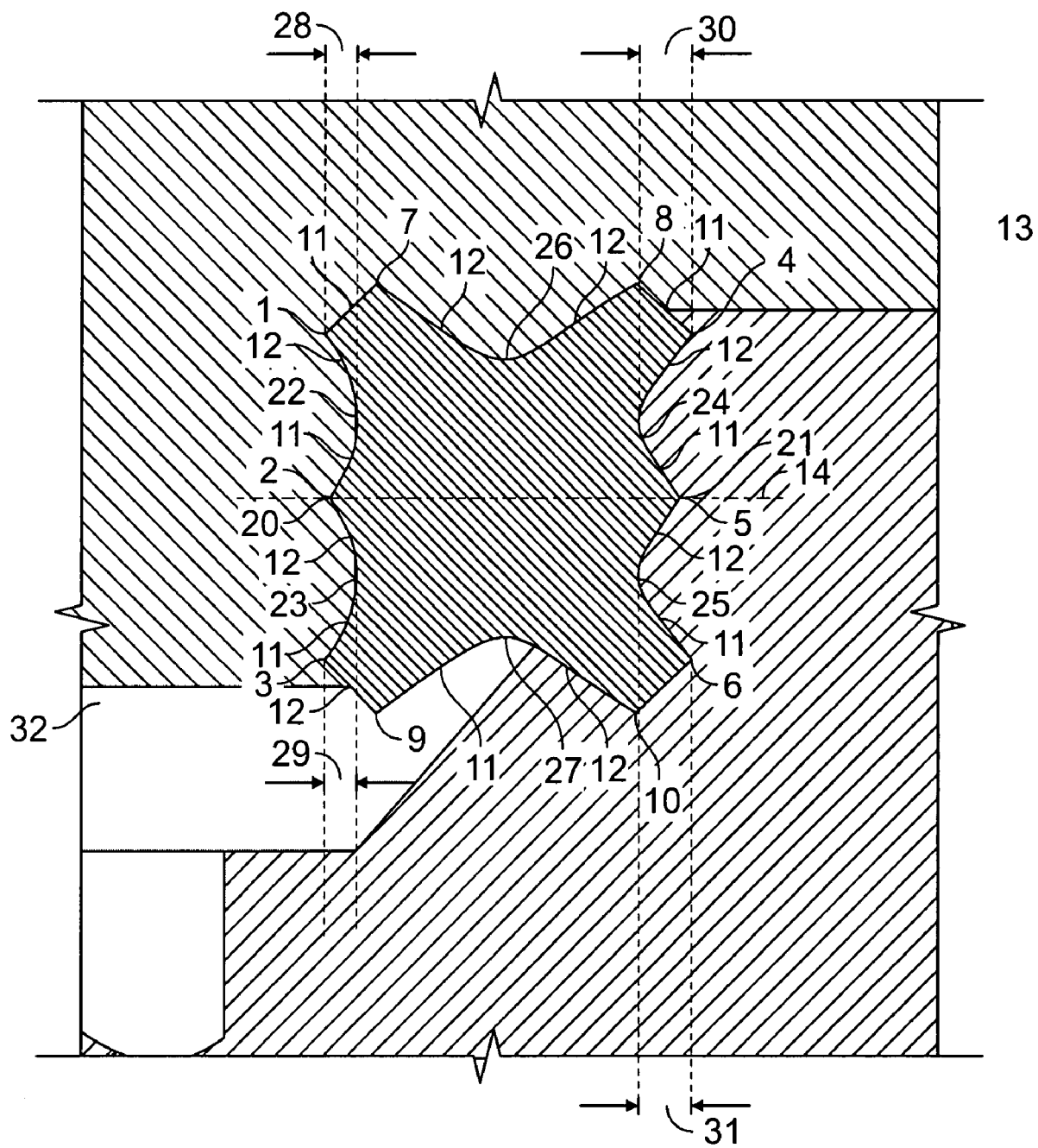
FIG. 11 an example of a mushroom-shaped ejector.

An exemplary embodiment of a mushroom-shaped ejector is shown in FIG. 11. Transitional regions 24, 25 each have a larger projected annular surface area than transitional regions 22, 23 on the inside diameter of the sealing ring. Thus, the sealing ring remains stuck by its transitional regions 24, 25 to the ejector side and is able to be pushed out of the mold by mushroom-shaped ejector 32. The sum of the projected annular surface areas of the radially outer transitional regions 24, 25 is greater than the sum of the projected annular surface areas of the radially inner transitional regions 22, 23.

In contrast, the sealing rings of FIGS. 2, 4, 6, 8 and 10 are produced by a mold having an externally-engaging ejector plate.

Figure 12:
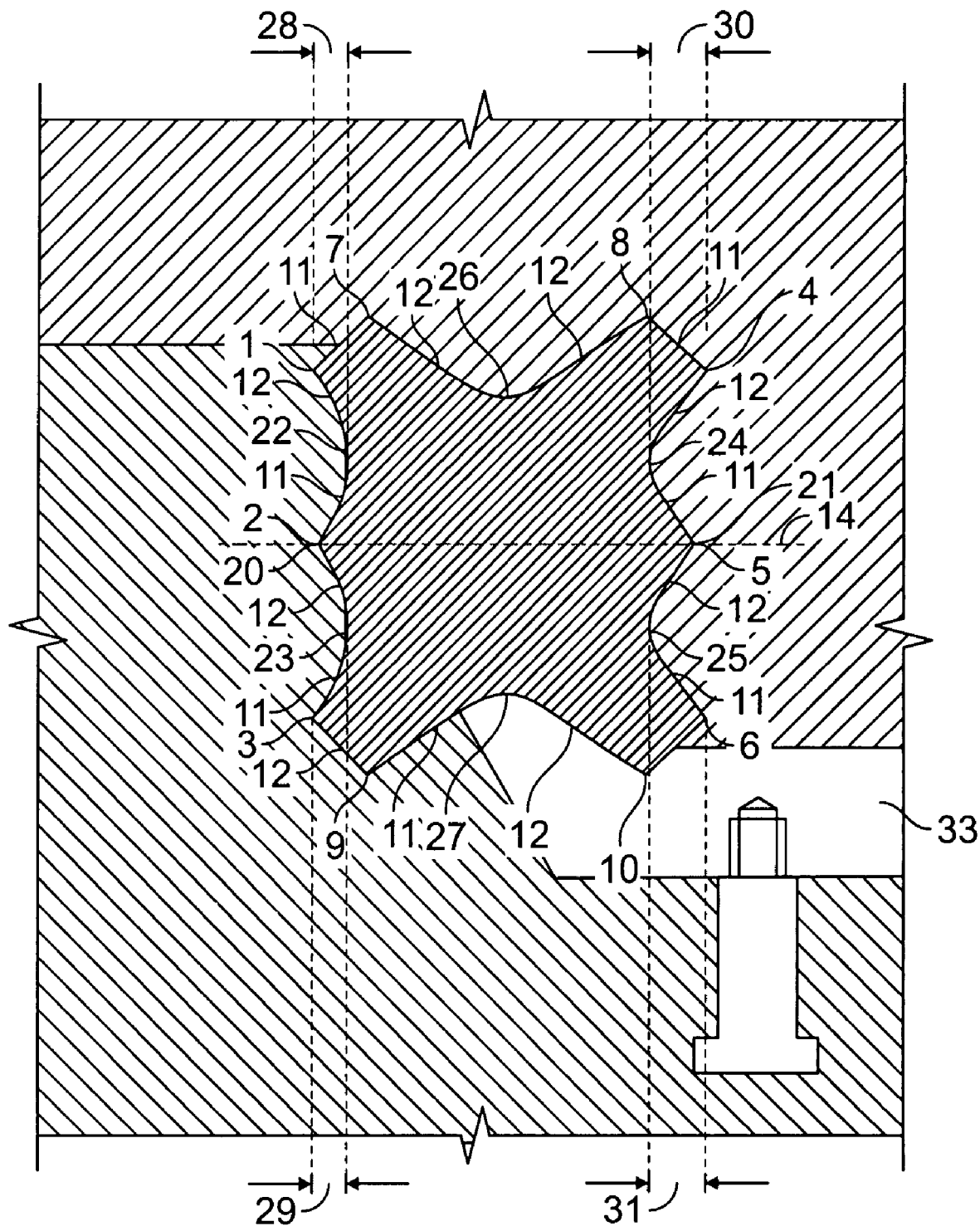
FIG. 12 an example of an ejector plate.

An exemplary embodiment of an ejector plate is shown in FIG. 12. Relative to radially outer transitional regions 24, 25, radially inner transitional regions 22, 23 have a greater radial depth. The sum of the projected annular surface areas of radially inner transitional regions 22, 23 is greater than the sum of the projected annular surface areas of radially outer transitional regions 24, 25. As a result, the sealing ring remains stuck to the core of the ejector side and is able to be pushed out by ejector plate 33.

In all of the exemplary embodiments, three of the sealing edges 1, 2, 3 are disposed on the radially inner side and three of the sealing edges 4, 5, 6 on the radially outer side, concavely shaped transitional regions 22, 23 being disposed between inner radial sealing edges 1 and 2, as well as 2 and 3, and the likewise concavely shaped transitional regions 24, 25 being disposed between outer radial sealing edges 4, 5; 5, 6. The somewhat flatter concave curvature between the inner radial sealing edges is an indication that these sealing rings are produced using a mold having an inwardly-engaging mushroom-shaped ejector. In contrast, flatter transitional regions 24, 25 between radially outer sealing edges 4, 5; 5, 6 suggest a manufacturing method which makes use of a mold having an externally engaging ejector plate.

Each of the illustrated sealing rings has ten sealing edges 1-10 which are all bounded by mutually intersecting conical surfaces 11, 12. Radially inner sealing edges 1, 2, 3 and radially outer sealing edges 4, 5, 6 are disposed in radial opposition to one another, in a respective imaginary radial plane 13, 14, 15.

The exemplary embodiments of FIGS. 1, 2, 5, 6, 9 and 10 each have a symmetrical design with respect to an imaginary, axially central, radial plane 14, axially central, radial sealing edges 2, 5 in the exemplary embodiments shown here having a larger sealing edge radius 20, 21 than radial sealing edges 1, 3; 4, 6 disposed axially adjacently, respectively, on both sides.

When the manufacturing method employing "inwardly engaging mushroom-shaped ejectors" is applied, sealing rings are produced whose transitional regions 22, 23 between radially inner sealing edges 1, 2; 2, 3 have a smaller radial depth 28, 29 than transitional regions 24, 25 between radially outer sealing edges 4, 5; 5, 6.

On the other hand, when the manufacturing method employing an "externally engaging ejector plate" is applied, sealing rings are produced whose transitional regions 24, between radially outer sealing edges 4, 5; 5, 6 have a smaller radial depth 30, 31 than transitional regions 22, 23 between radially inner sealing edges 1, 2; 2, 3.

In the exemplary embodiments according to FIG. 1 through 8, at least one of the two end faces 16, 17 has two axial sealing edges 7, 8; 9, 10, which are configured mutually adjacently, with radial clearance therebetween. These axial sealing edges 7, 8; 9, are each bounded by mutually intersecting conical surfaces 11, 12.

In FIG. 1 through 6, both end faces 16, 17 each have two respective axial sealing edges 7, 8; 9, 10. Here, as well, transitional regions 26, 27 between inner axial sealing edges 7, 9 and outer axial sealing edges 8, 10 have a concave form.

Figure 1:
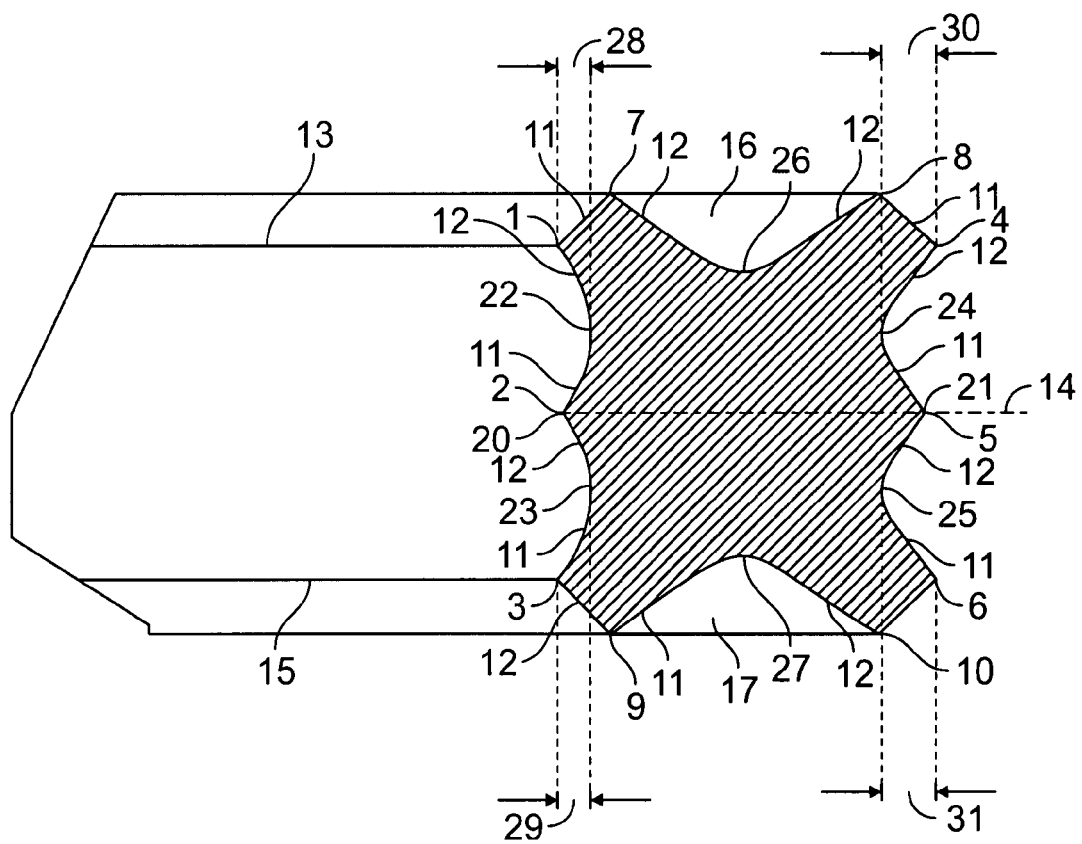
FIG. 1 a first exemplary embodiment of a sealing ring produced using a mold having an inwardly-engaging mushroom-shaped ejector.
Figure 2:
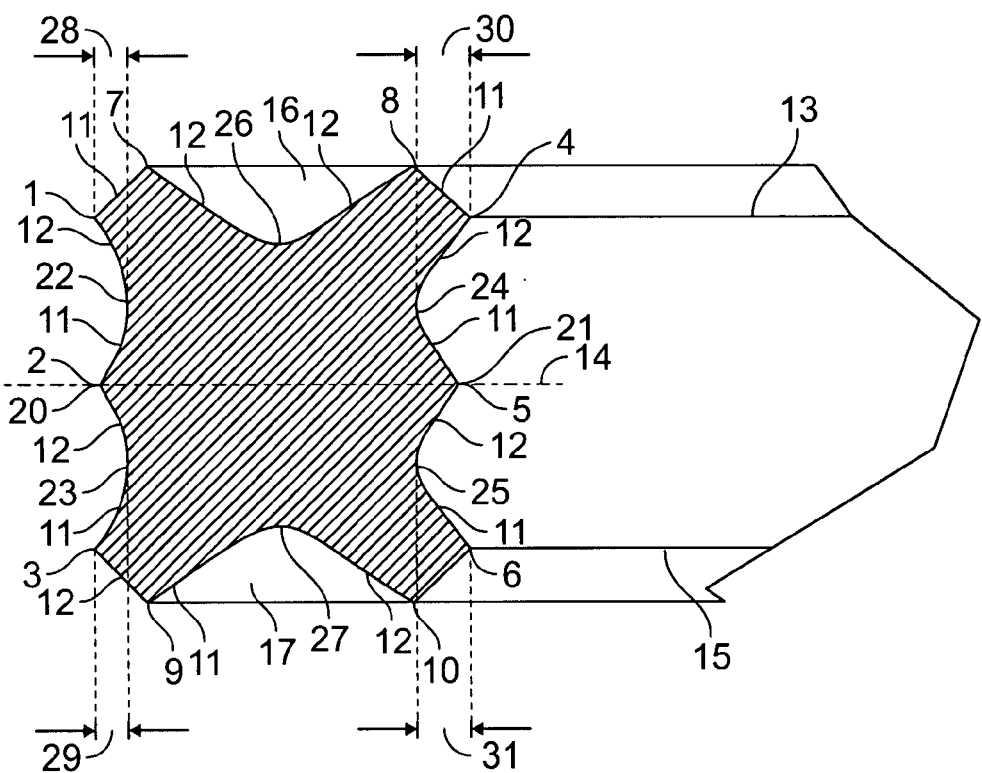
FIG. 2 a second exemplary embodiment, similar to that of FIG. 1, produced using a mold having an externally-engaging ejector plate.
Figure 3:
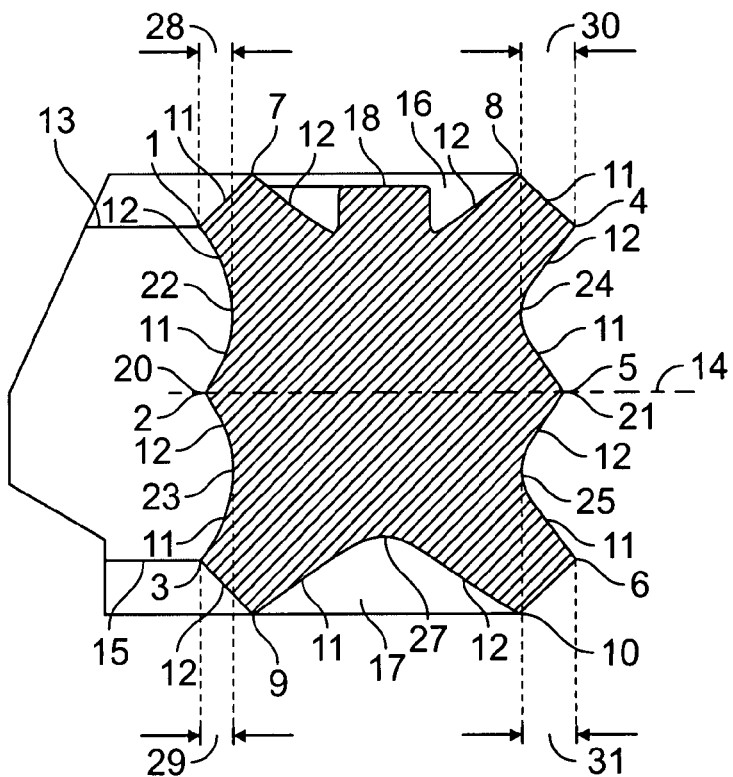
FIG. 3 a third exemplary embodiment, similar to that of FIG. 1, having a support bead disposed at the end face, on one side.
Figure 4:
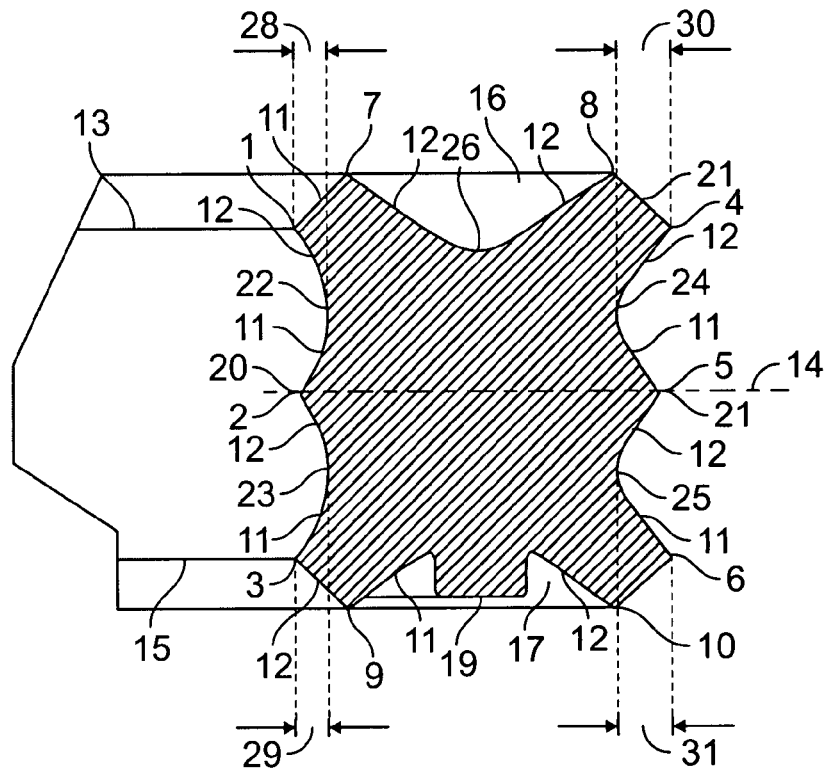
FIG. 4 a fourth exemplary embodiment, similar to that of FIG. 2, having a support bead disposed at the end face, on one side.
Figure 5:
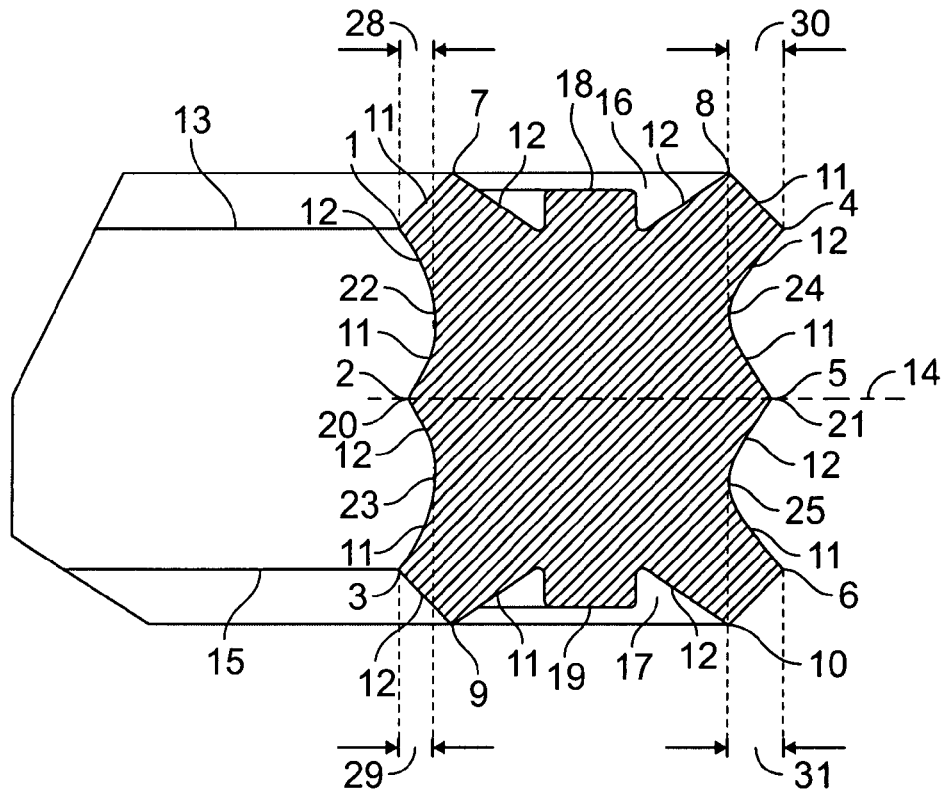
FIG. 5 a fifth exemplary embodiment, similar to that of FIG. 1, having a support bead at each of both end faces.
Figure 6:
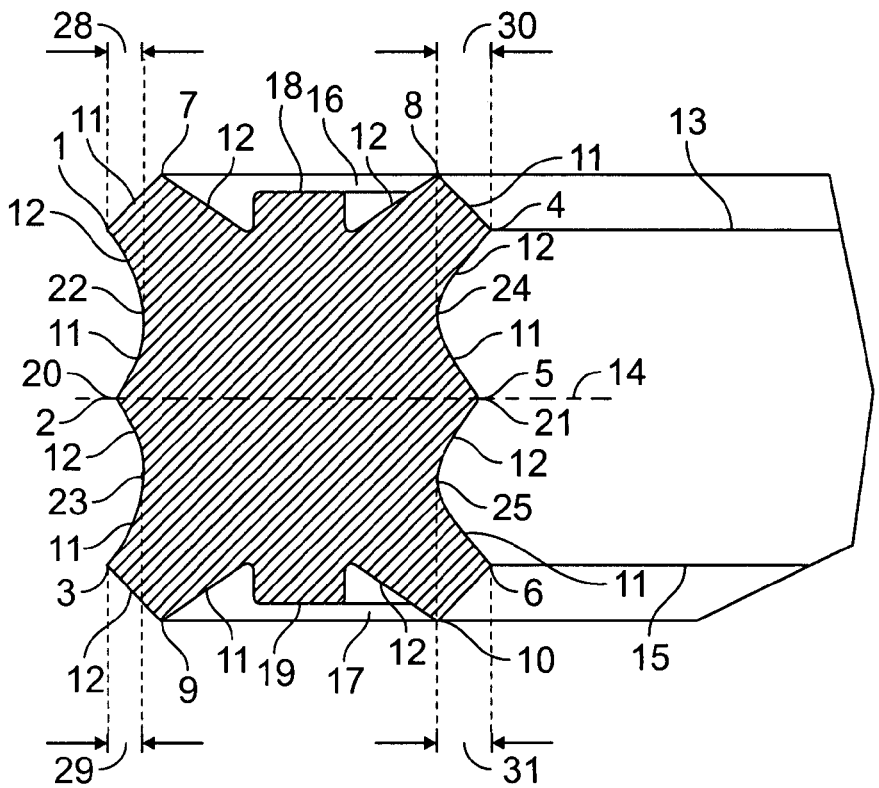
FIG. 6 a sixth exemplary embodiment, similar to those of FIGS. 2 and 5.
Figure 7:
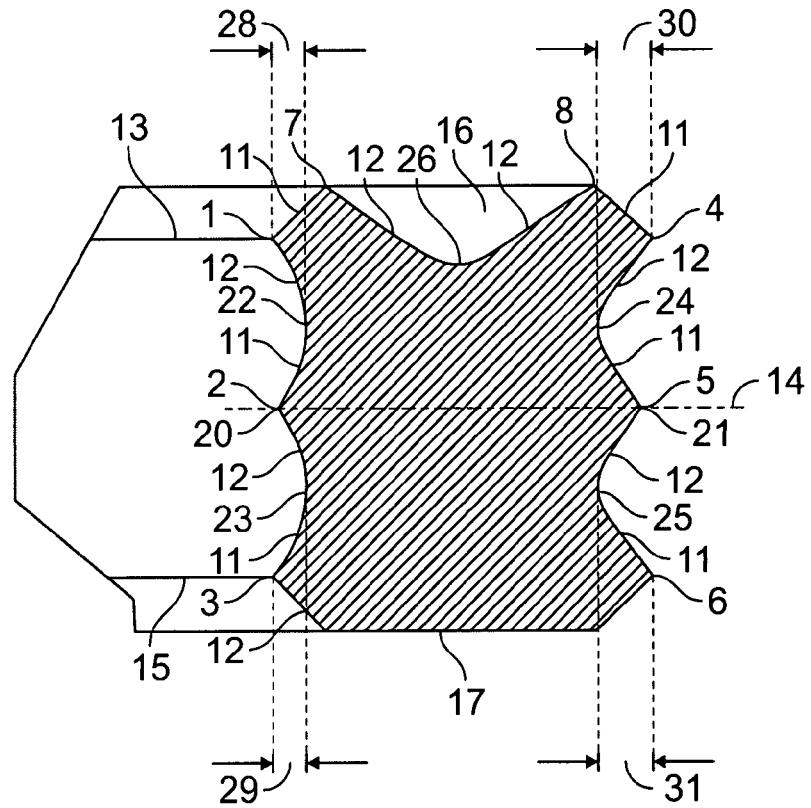
FIG. 7 a seventh exemplary embodiment, similar to that of FIG. 1, viewed in the radial direction, one of the end faces having a planar form.
Figure 8:
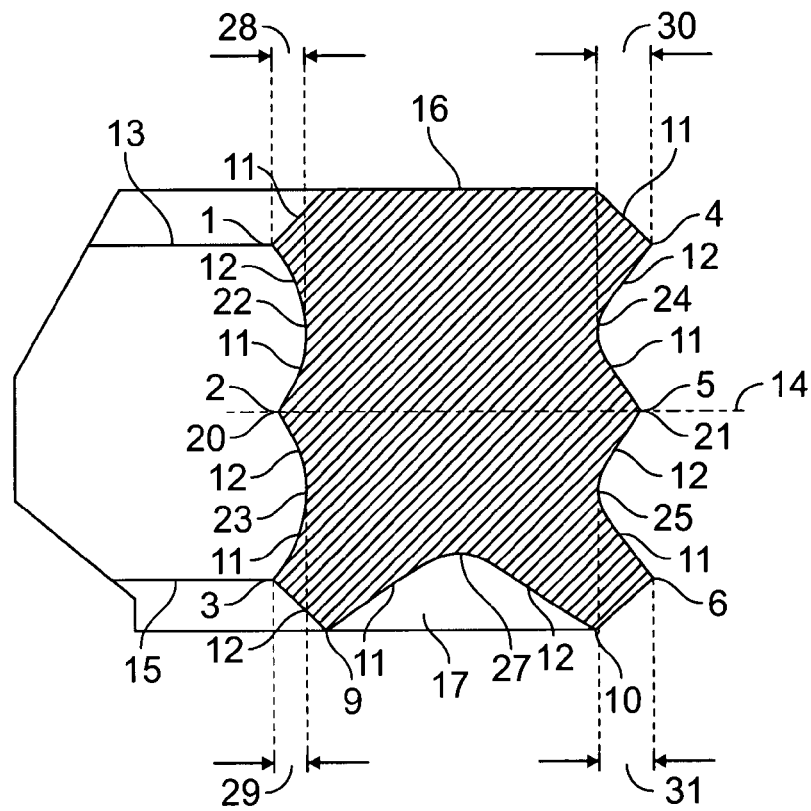
FIG. 8 an eighth exemplary embodiment, similar to that of FIG. 2, one of the end faces having a planar form.
Figure 9:
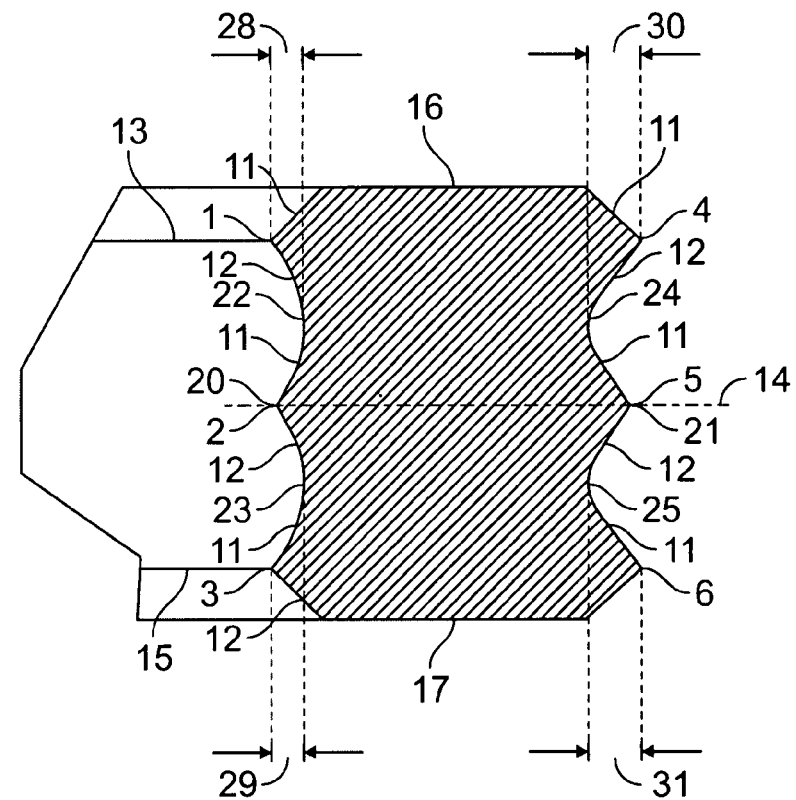
FIG. 9 a ninth exemplary embodiment, similar to that of FIG. 7, both end faces having a planar form.
Figure 10:
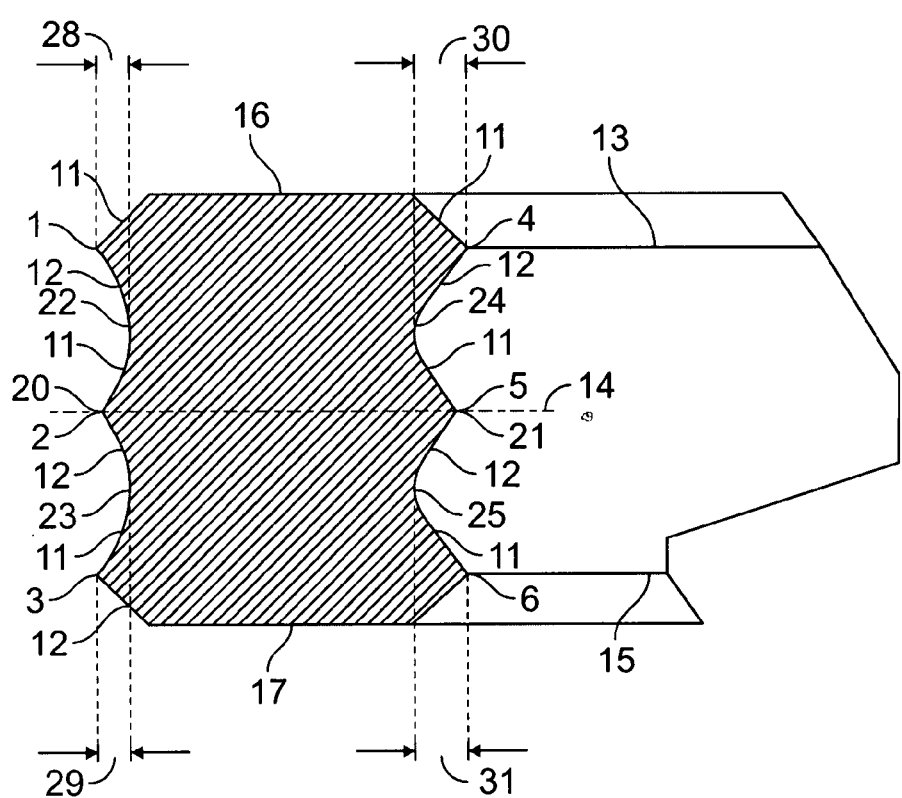
FIG. 10 a tenth exemplary embodiment, similar to that of FIG. 8, both end faces having a planar form.

In contrast, transitional regions 26, 27 between sealing edges 7, 8; 9, 10 in FIGS. 9 and 10 have a planar form in the radial direction.

In the exemplary embodiments shown here, the transitional regions, which interconnect the dynamically claimed sealing edges, are designed as lubricant pockets that are filled with a lubricating grease, for example.

All of the illustrated sealing rings may be formed in one piece and uniformly of the same material, may be made of a thermoplastic polyurethane, and may have a Shore hardness A of 80 to 90

All of the sealing rings illustrated here are protected by their geometry from any undesirable twisting/distortion during installation and normal operational use. Due to the high specific surface pressure, an efficient sealing action is achieved by sealing edges 1 through 10, which are bounded by mutually intersecting conical surfaces 11, 12, even when the sealing ring is only slightly compressed within its installation space.

Both the manufacturing method employing "inwardly engaging mushroom-shaped ejectors," as well as the method employing an "externally engaging ejector plate" produce sealing rings whose functional surfaces are free of flash lines. Both manufacturing methods are in the field of injection molding technology. Once the sealing rings have been ejected from the mold, they are ready for use; both the method employing "inwardly engaging mushroom-shaped ejectors," as well as the method employing "an externally engaging ejector plate" make it possible for sealing rings to be manufactured in a process that is free of any finish machining steps.

FIGS. 3, 4, 5 and 6 each show an exemplary embodiment in which, at least in the area of one of the two end faces 16, 17, two axial sealing edges 7, 8, 9, 10 are provided, a support bead 18, 19 being disposed between radially mutually adjacent, axial sealing edges 7, 8, 9, 10. When axial differential pressure is applied, support bead 18, 19 prevents axial sealing edges 7, 8, 9, 10 from being subject to mechanical deformations of undesirable magnitude.

What is claimed is:

1. A sealing ring comprising
at least eight sealing edges,
wherein at least two sealing edges are disposed on a radially inner surface of the sealing ring and at least two sealing edges are disposed on a radially outer surface of the sealing ring,
wherein a concave transition region is disposed between each of two radially inner sealing edges and two radially outer sealing edges, wherein the respective concave transition regions which are between the radially inner sealing edges and radially outer sealing edges, and which are intersected by the same radial plane, have different radial depths, and
wherein the eight sealing edges include centrally disposed radial sealing edges and further sealing edges, all of the further sealing edges except the centrally disposed radial sealing edges have a conforming design.

2. The sealing ring as recited in claim 1 wherein the sealing edges are each bounded by mutually intersecting conical surfaces.

3. The sealing ring as recited in claim 1 wherein three of the sealing edges are disposed on a radially inner side and three of the sealing edges on a radially outer side, and the radially inner sealing edges and the radially outer sealing edges are configured mutually adjacently, each with axial clearance therebetween.

4. The sealing ring as recited in claim 1 wherein at least some radially inner sealing edges and radially outer sealing edges radially opposing one another in an imaginary radial plane.

5. The sealing ring as recited in claim 1 wherein the sealing ring defines first and second end faces, at least the first end face has two axial sealing edges and the at least eight sealing edges including two axial sealing edges, wherein the two axial sealing edges of the first end faces are configured mutually adjacently, with radial clearance therebetween, and are each bounded by mutually intersecting conical surfaces.

6. The sealing ring as recited in claim 5 wherein the eight sealing edges include two further axial sealing edges at the second end face.

7. The sealing ring as recited in claim 1 wherein the sealing ring has a symmetrical design with respect to an imaginary, axially central, radial plane.

8. The sealing ring as recited in claim 1 wherein the centrally disposed radial sealing edges have a larger sealing edge radius than each of the radial sealing edges disposed axially adjacently on both sides.

9. The sealing ring as recited in claim 1 further including radial sealing edges disposed axially adjacent both sides of the centrally disposed radial sealing edges and wherein the centrally disposed radial sealing edges and the radial sealing edges when viewed in longitudinal section, have concave transitional regions between the axially adjacent radial sealing edges or between the radially adjacent axial sealing.

10. The sealing ring as recited in claim 9 wherein at least the transitional regions between mutually adjacent, dynamically stressed sealing edges are designed as lubricant pockets fillable with a lubricant.

11. The sealing ring as recited in claim 1 wherein the sealing ring is formed in one piece and uniformly of the same material.

12. The sealing ring as recited in claim 11 wherein the sealing ring is made of a thermoplastic polyurethane.

13. The sealing ring as recited in claim 1 wherein the sealing ring has a Shore hardness A of 80 to 90.

14. The sealing ring as recited in claim 1 wherein the sealing ring is made of a thermoplastic polyurethane.

* * * * *